United States Patent [19]
Ceravolo

[11] Patent Number: 5,983,882
[45] Date of Patent: Nov. 16, 1999

[54] BARBECUE GRILL APPARATUS

[76] Inventor: Frank J. Ceravolo, 2877 N.E. 29th St., Fort Lauderdale, Fla. 33306

[21] Appl. No.: 08/963,062

[22] Filed: Oct. 31, 1997

[51] Int. Cl.$^6$ .............................. A47J 37/00; F24B 3/00; A22C 7/00
[52] U.S. Cl. ............... 126/25 R; 126/25 A; 126/25 AA; 126/41 A; 126/30; 99/444; 99/447; 426/523
[58] Field of Search .......................... 126/25 A, 25 AA, 126/25 R, 41 A, 41 R, 30; 99/444, 447, 450; 426/523

[56] References Cited

U.S. PATENT DOCUMENTS

| | | | |
|---|---|---|---|
| 2,740,395 | 4/1956 | Goodwin | 126/25 A |
| 2,986,138 | 5/1961 | Moore et al. | 126/25 A |
| 2,996,597 | 8/1961 | Persinger et al. | 219/34 |
| 3,258,001 | 6/1966 | Virgil | 126/25 AA |
| 3,512,515 | 5/1970 | McGee | 126/25 AA |
| 3,696,800 | 10/1972 | Close, Jr. | 126/25 A |
| 3,967,613 | 7/1976 | Rybak et al. | 126/41 R |
| 4,281,633 | 8/1981 | Wackerman | 126/25 C |
| 4,932,390 | 6/1990 | Ceravolo | 126/25 |
| 5,099,821 | 3/1992 | Ceravolo | 126/25 R |
| 5,355,867 | 10/1994 | Hall et al. | 126/30 |
| 5,456,163 | 10/1995 | Ceravolo | 99/446 |

FOREIGN PATENT DOCUMENTS

| 908524 | 8/1972 | Canada | 126/104 |
|---|---|---|---|

*Primary Examiner*—Ira S. Lazarus
*Assistant Examiner*—David Lee
*Attorney, Agent, or Firm*—Oltman, Flynn & Kubler

[57] ABSTRACT

A barbecue grill apparatus is provided for cooking food items, including a housing having a housing bottom wall and a housing side wall, an upright grill support member extending centrally within the housing, and at least two food supporting grid sections mounted one above the other on the grill support member, at least one of the food supporting grid sections being mounted rotatably relative to the other food supporting grid section, so that one of the grid sections is rotatable to a position underneath another of the food supporting grid sections. The apparatus preferably additionally includes a fuel supporting grid mounted to the grill support member below the at least two food supporting grid sections and spaced above the housing bottom wall. The apparatus preferably further includes lid and grid section elevation structures for raising and lowering the support member within the housing to any one of several discrete support member elevational positions and for releasibly retaining the support member and lid at a given the elevational position. A method of cooking a food item with the barbecue grill includes the steps of placing the food item on one of the food supporting grid sections, and rotating the food supporting grid sections so that the other food supporting grid section extends at least partially directly over the one food supporting grid section, so that the food item extends between and abuts both of the one and the other food supporting grid section.

22 Claims, 7 Drawing Sheets

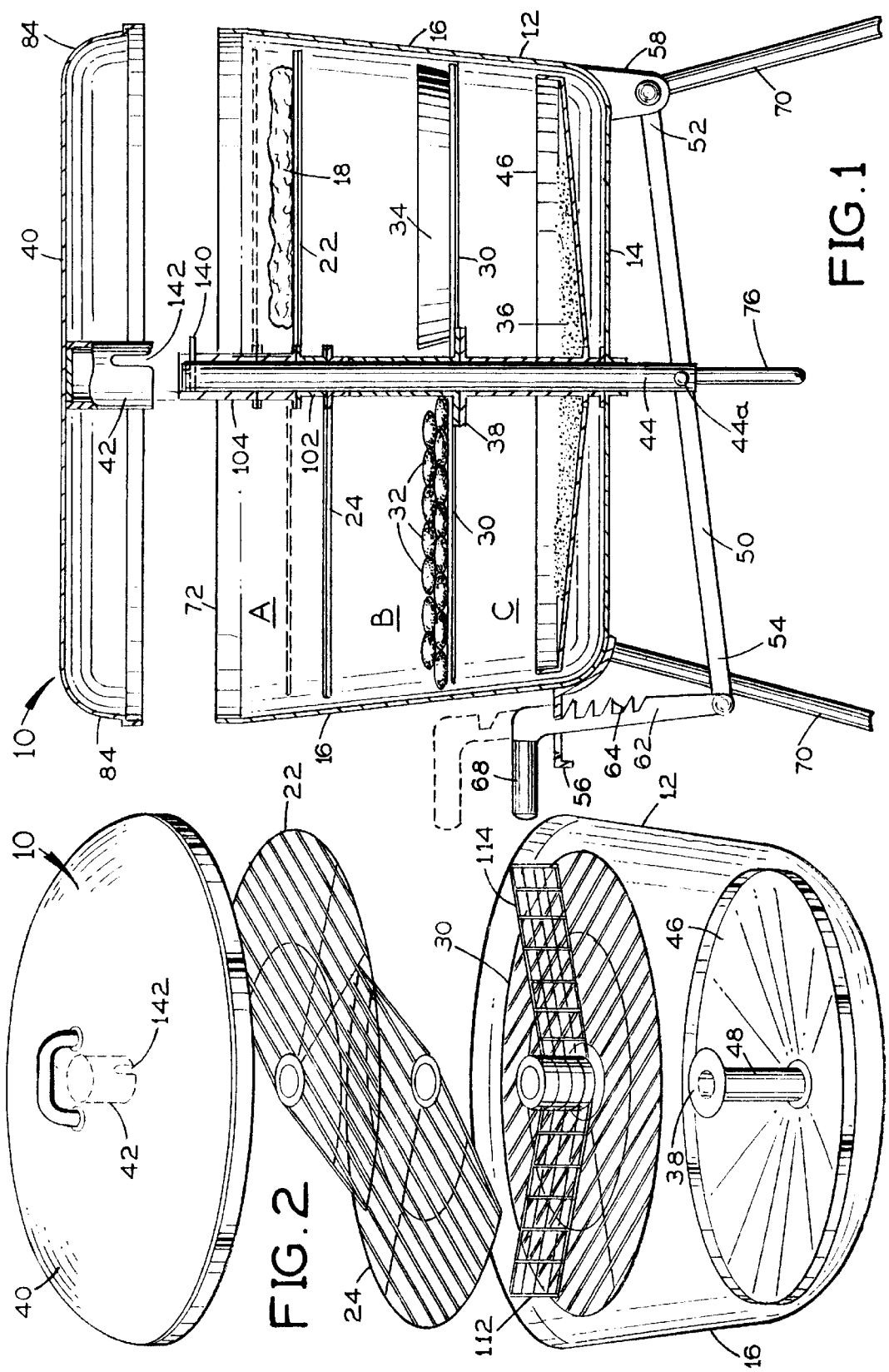

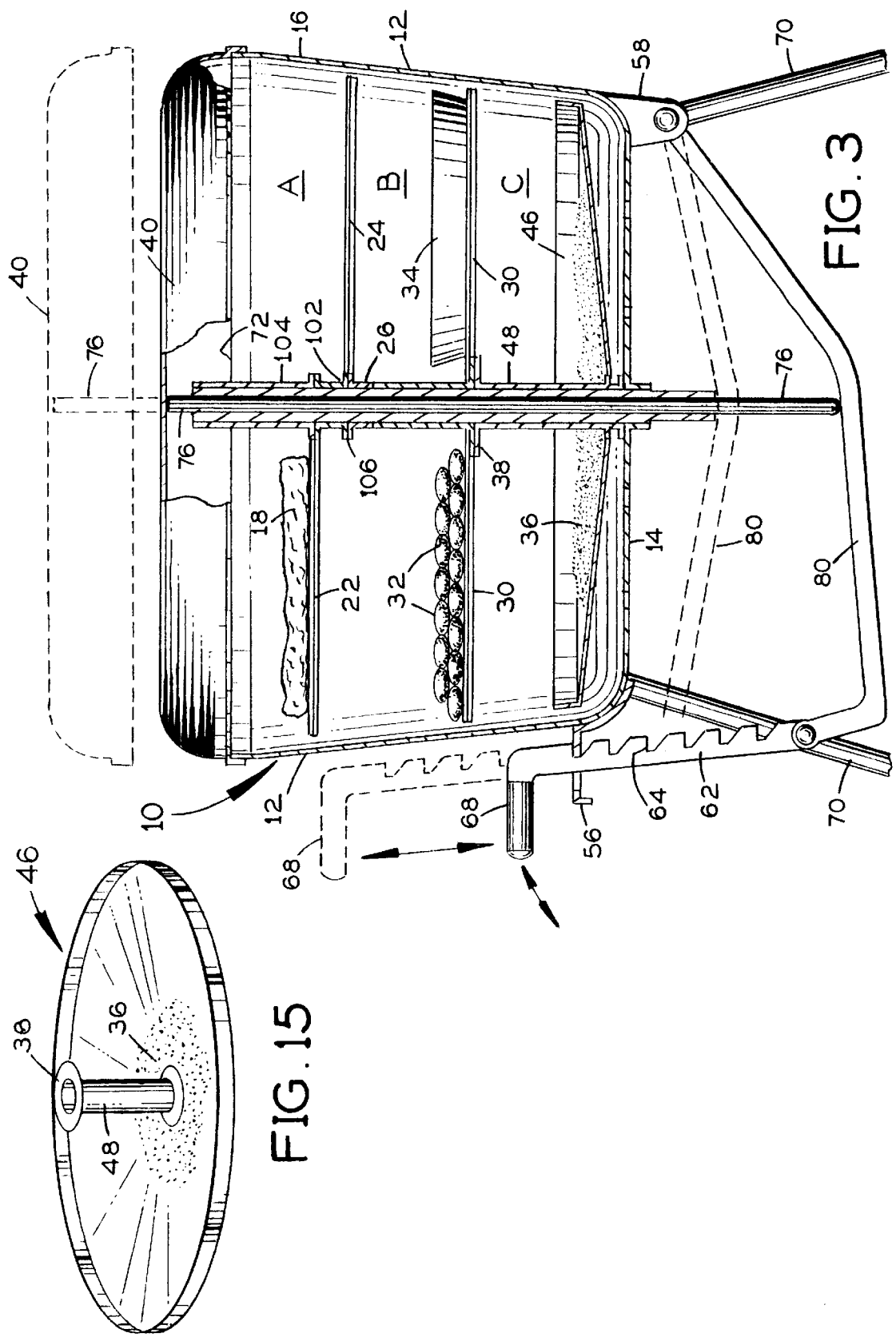

BARBECUE GRILL APPARATUS

BACKGROUND OF THE INVENTION

1. Field of the Invention

The present invention relates generally to the field of outdoor cooking equipment. More specifically the present invention relates to a barbecue grill apparatus including a housing having bottom and side walls and containing one, and preferably two food supporting grid sections rotatably mounted one above the other on an upright central grill support member, and a fuel supporting grid encircling the support member below the food supporting grid sections and spaced above the housing bottom wall. One food supporting grid section is rotatable underneath another such grid section to provide the user with access to the fuel supporting grid for placement and retrieval of fuel items. The rotatability of the grid sections also permits indirect cooking by concentrating the fuel on one region of the fuel supporting grid and by rotating the grid section supporting the food items to a position within the housing opposite the concentrated fuel. A drip pan can be placed under the grill section supporting the food items. Intermittent cooking can also be achieved by periodically rotating the grid sections over and away from the concentrated fuel. The free-spinning grill virtually eliminates uneven cooking to safely reduce harmful toxins released with overcooked meat and controls flare-ups while cooking, increases fuel efficiency.

A housing lid having a central tubular fitting is mounted onto the grill support member and the support member is elevatable within the tubular axle wall to selected levels to provide varying degrees of lateral venting during cooking. The housing lid is also lowerable to a closing position in which the lid makes sufficient sealing contact with the housing side wall to obstruct the flow of oxygen into the housing and thereby extinguish the fuel fire.

2. Description of the Prior Art

There have long been outdoor grills for cooking various food items to produce the widely appreciate, fresh barbecue taste. The present applicant has contributed to this art with the disclosures in following patents.

Ceravolo, U.S. Pat. No. 5,456,163, issued on Oct. 10, 1995, teaches a juice and gravy drippings collector system for barbecue grills. A grill housing is provided in which an inclined surface or separate chamber within the housing collects gravy and juices. The grill apparatus includes a free-spinning half grid for enhancing even cooking. Despite its benefits, a problem with this grill design is that only a half-grid region is provided for supporting food during cooking, limiting productivity. Other problems are that no provision is made for limited venting of the interior of the housing and no provision is made for safely extinguishing the fuel fire.

Ceravolo, U.S. Pat. No. 5,099,821, issued on Mar. 31, 1992, discloses a multi-chambered barbecue grill. This grill apparatus includes a main chamber, a cooking grill located in the main chamber, a fire source located in the main chamber below the cooking grill, and an ash chamber integral with or attached to the main chamber below the fire source for catching ashes. Also included is a reversible top chamber located above the main chamber, which is adapted for receiving the cooking grill in its reversed position. A problem with this design is that access to the lower, fuel supporting grid is not as convenient as it might be.

Ceravolo, U.S. Pat. No. 4,932,390, issued on Jun. 12, 1990, reveals an adjustable barbecue grill. This grill apparatus includes a food-support grid that is adjustable both vertically and rotatively on a vertical threaded rod. The vertical adjustment determines the spacing of the food being cooked above the other heat source. The rotative adjustment enables the food to be positioned to one side of the heat source to provide a keep-warm mode for already cooked food and a thawing mode for food yet to be cooked. The problems of the design described immediately above are generally again presented.

It is thus an object of the present invention to provide a cooking grill apparatus which provides the user with access to fuel items without removal of the food supporting grid.

It is another object of the present invention to provide such an apparatus which permits indirect cooking for defrosting and reheating and permits intermittent heating to eliminate uneven cooking to safely reduce harmful toxins released with overcooked meat and which controls flare-ups while cooking.

It is a further object of the present invention to provide such an apparatus which permits selection and placement of the specific quantity of fuel needed for cooking a given amount of food.

It is still another object of the present invention to provide such an apparatus which permits adjustment of the grill housing lid height to selected levels to provide varying degrees of lateral venting during cooking, and to a closed level in which the lid makes sufficient sealing contact with housing to obstruct the flow of oxygen into the housing and thereby extinguish the fuel fire, safely preventing sparks from falling out of the housing and starting a house or forest fire.

It is finally an object of the present invention to provide such an apparatus which increases fuel efficiency, is sturdy, inexpensive to manufacture, safe and reliable.

SUMMARY OF THE INVENTION

The present invention accomplishes the above-stated objectives, as well as others, as may be determined by a fair reading and interpretation of the entire specification.

A barbecue grill apparatus is provided for cooking food items, including a housing having a housing bottom wall and a housing side wall, an upright grill support member extending centrally within the housing, and at least two food supporting grid sections mounted one above the other on the grill support member, at least one of the food supporting grid sections being mounted rotatably relative to the other food supporting grid section, so that one of the grid sections is rotatable to a position underneath another of the food supporting grid sections.

The apparatus preferably additionally includes a fuel supporting grid mounted to the grill support member below the at least two food supporting grid sections and spaced above the housing bottom wall. The apparatus preferably further includes a lid and grid section elevation structure, including a support member passing port in the housing bottom wall, the support member slidably fitted within the support member passing port, a food supporting grid section engagement element on the support member, and an elevation mechanism for raising and lowering the support member within the housing to any one of several discrete support member elevational positions and for releasibly retaining the support member at a given the elevational position, and a housing lid including a structure for mounting the housing lid onto the lid support member, so that the housing lid is elevated and lowered together with the support member and the food supporting grid sections.

The structure for mounting the housing lid preferably mounts the housing lid removably and includes an upright tubular fitting secured to the interior of the housing lid, the upright tubular fitting being sized in diameter relative to the lid support member to fit over and onto the lid support member.

The elevation means preferably includes an elevation arm having an arm first end and an arm second end and which is pivotally connected to the housing at a first point spaced radially outward from the support member passing port, the elevation arm extending across and underneath the housing bottom wall and being pivotally connected at a second point to the support member between the elevation arm first and second ends, the second point being spaced apart from the first point, the elevation arm extending to and being pivotally connected at a third point to a latching plate having a toothed edge, the third point being spaced apart from the first point, and a locking member mounted to the housing, so that the latching plate is pivotable to fit the locking member engagingly between any selected pair of teeth on the locking member toothed edge, thereby releasibly locking the support member and thus the lid and food supporting grid sections at a given, selected elevation relative to the housing and so that the food supporting grid sections are lowerable to a lid closing position in which the lid makes sufficient sealing contact with the housing side wall to obstruct the circulation of air into the housing and thereby extinguish a fuel fire.

The housing side wall preferably terminates in an upwardly directed housing rim, and the lid includes a lid upper wall integral with a lid side wall, the lid side wall including in a downwardly directed lid lip. The apparatus preferably further includes a hanging pin secured to and extending within the lid at a point along the lid lip for abutting the housing rim to removably suspend the lid beside the housing and from the housing rim, during loading and removal of fuel and food items and during apparatus cleaning.

The food supporting grid sections are preferably two semicircular half-disk upper and lower grid sections, the upper and lower grid sections being rotatable relative to each other to any one of the positions of: the lower grid section being directly and fully beneath the upper grid section; the lower grid section being fully removed from under the upper grid section to form a composite full circular grid, and the lower grid section being only partially beneath the upper grid section.

The lower grid section preferably includes a lower grid frame and an upright first mounting tube having a top wall and is fixedly attached to the lower grid frame and fitted rotatably around the grill support member, the upright first mounting tube abutting and resting on the support member stop; and the upper grid section preferably includes an upper grid frame and an upright second mounting tube fixedly attached to the upper grid frame, the second mounting tube being sized in interior diameter to fit rotatably around the first mounting tube, so that the upper grid section rests on the lower grid section.

The apparatus preferably additionally includes first and second grid partitions extending radially outward from the grill support member immediately above the fuel supporting grid which are mounted rotatably on the grill support member, so that the first and second grid partitions pivot around the grill support member to define a fuel retaining region on the fuel supporting grid of infinitely variable size and location. The first partition is optionally fixedly attached to a first mounting tube and the second partition is then fixedly attached to a second mounting tube, the first and second mounting tubes being rotatably fitted over the grill support member, the first mounting tube extending from the lower end of the first grid partition upwardly and resting against the fuel supporting grid, and the second mounting tube extending from the upper end of the second grid partition downwardly and resting on the first mounting tube.

The apparatus preferably additionally includes an annular ash retaining tray sized to fit around and over the grill support member and into the housing beneath the fuel supporting grid. The ash retaining tray preferably includes an ash retaining tray hub tube extending upwardly from the center of the ash retaining tray. The ash retaining tray hub tube preferably includes a radially extending hub tube lip abutting and supporting the fuel supporting grid and for gripping by the user to lift the ash retaining tray.

The lid upright tubular fitting preferably includes a pin receiving notch, and the grid section preferably includes a grid frame and an upright grid mounting tube fixedly attached to the grid frame and fitted rotatably around the grill support member, the grid mounting tube including a radial port and additionally including a lid rotational locking pin passing into the radial port in the grid mounting tube and fitting laterally into the pin receiving notch in the lid upright tubular fitting for constraining the lid to rotate substantially in unison with the grid section on the grill support member.

A barbecue grill apparatus is further provided for cooking food items, including a housing having a housing bottom wall and a housing side wall, an upright grill support member extending within the housing, at least one food supporting grid section mounted on the grill support member, and a grid section rotation brake structure for releasibly securing the food supporting grid section against rotation relative to the housing side wall.

A barbecue grill apparatus is still further provided for cooking food items, including a grill housing, an upright tubular grill support member secured within the grill housing, a food supporting grid rotatably mounted on the grill support member, a support member passing port in the housing bottom wall, the support member slidably fitted within the support member passing port, a food supporting grid engagement structure on the support member, a first elevation mechanism for raising and lowering the support member within the housing to any one of several discrete support member elevational positions and for releasibly retaining the support member at a given elevational position, and a housing lid including a structure for mounting the housing lid onto the lid support member, so that the housing lid is elevated and lowered together with the support member and the food supporting grid.

The apparatus preferably additionally includes a lid lifting shaft slidably retained within the tubular grill support member, and a second elevation mechanism for raising and lowering the lid lifting shaft within the housing to any one of several of discrete support member elevational positions and for releasibly retaining the lid lifting shaft and lid at a given the elevational position, and a structure for mounting the housing lid onto the lid lifting shaft, so that the housing lid is elevated and lowered together with the lid lifting shaft and the food supporting grid. The first elevation mechanism preferably includes a first elevation arm having an arm first end and an arm second end and is pivotally connected to the housing at a first point spaced radially outward from the support member passing port, the elevation arm extending across and underneath the housing bottom wall and being pivotally connected at a second point to the support member between the elevation arm first and second ends, the second point being spaced apart from the first point, the elevation arm extending to and being pivotally connected at a third point to a first latching plate having a toothed edge, the third point being spaced apart from the first point, and a locking member mounted to the housing, so that the first latching plate is pivotable to fit the locking member engagingly between any selected pair of teeth on the locking member toothed edge, thereby releasibly locking the support member and thus the lid and food supporting grid sections at a given, selected elevation relative to the housing and so that the food supporting grid sections are lowerable to a lid closing position which makes sufficient sealing contact with the housing side wall to obstruct the circulation of air into the housing and thereby extinguish a fuel fire.

The second elevation mechanism preferably includes a second elevation arm having an arm first end and an arm second end and is pivotally connected to the housing at a first point spaced radially outward from the support member passing port, the elevation arm extending across and underneath the housing bottom wall and being pivotally connected at a second point to the support member between the second elevation arm first and second ends, the second point being spaced apart from the first point, the elevation arm extending to and being pivotally connected at a third point to a second latching plate having a toothed edge, the third point being spaced apart from the first point, and the locking member mounted to the housing, so that the second latching plate is pivotable to fit the locking member engagingly between any selected pair of teeth on the locking member toothed edge, thereby releasibly locking the lid lifting shaft and thus the lid at a given, selected elevation relative to the housing and so that the lid is lowerable to a closing position in which the lid makes sufficient sealing contact with the housing side wall to obstruct the circulation of air into the housing and thereby extinguish a fuel fire.

A method is provided of cooking a food item with a barbecue grill apparatus as described above, including the steps of placing the food item on one of the food supporting grid sections, and rotating the food supporting grid sections so that the other food supporting grid section extends at least partially directly over the one food supporting grid section, so that the food item extends between and abuts both of the one and the other food supporting grid section.

BRIEF DESCRIPTION OF THE DRAWINGS

Various other objects, advantages, and features of the invention will become apparent to those skilled in the art from the following discussion taken in conjunction with the following drawings, in which:

FIG. 1 is a cross-sectional side view of the inventive grill apparatus, showing the three housing interior levels, the food supporting grid sections, the fuel supporting grid, the grill support member, the food grid interconnection pin and pin notch for causing rotation of the food grid when the lid is turned, and part of the first elevation arm mechanism for lifting the food grid and lid together. The rod frame is omitted for clarity.

FIG. 2 is an exploded view of the apparatus of FIG. 1.

FIG. 3 is a cross-sectional side view of the inventive grill apparatus as in FIG. 1, but showing the optional additional second elevation arm mechanism for lifting the lid only. Once again, the rod frame is omitted for clarity.

FIG. 15 is a perspective view of the preferred ash retaining tray, having the central hub tube and hub tube lip for gripping by the user to lift the tray out of the housing, for dumping ashes and cleaning the tray.

DETAILED DESCRIPTION OF THE PREFERRED EMBODIMENTS

Figure 4:
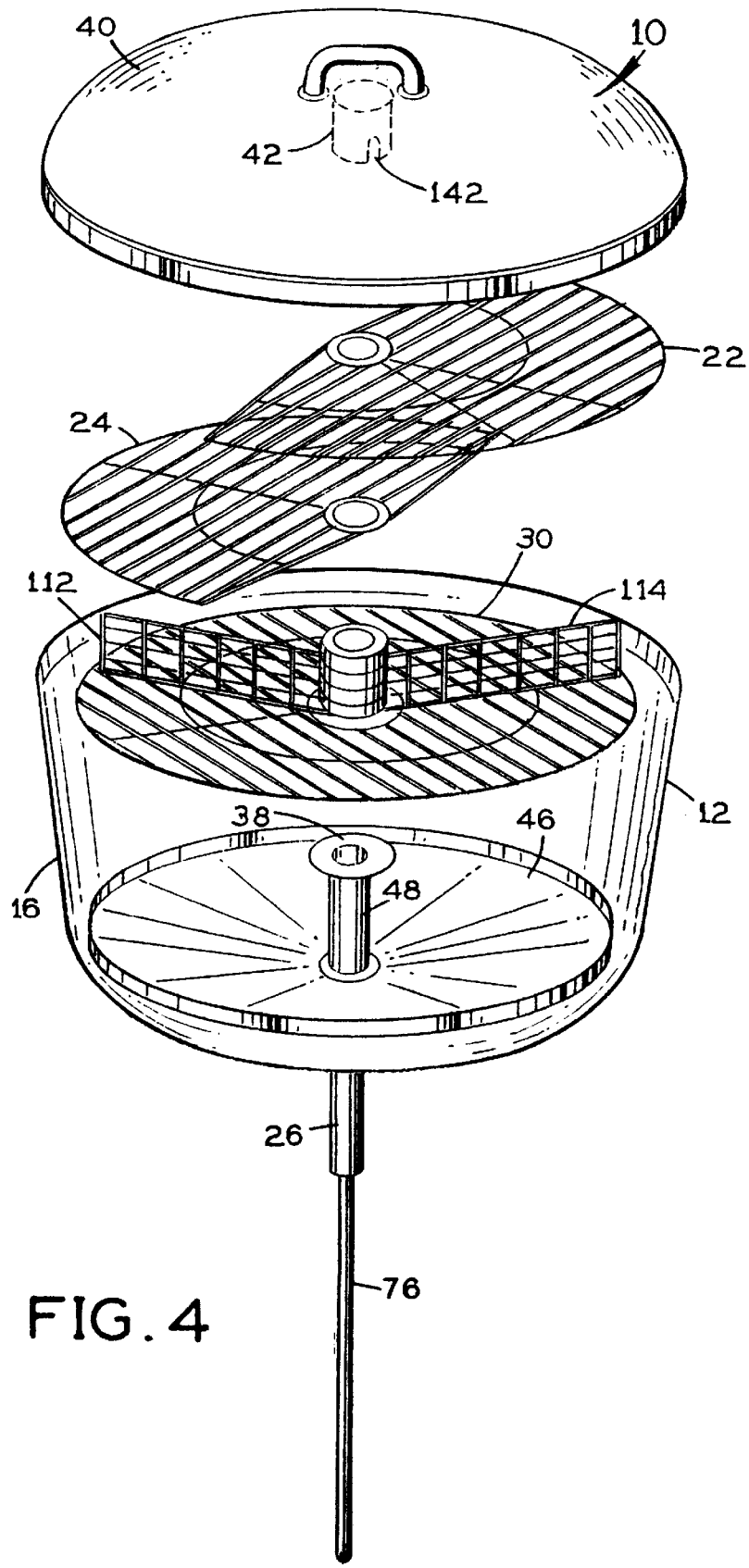
FIG. 4 is a view as in FIG. 2, with the optional lid lifting shaft added, and with the lid rotational securing pin and bore removed.
Figure 5:
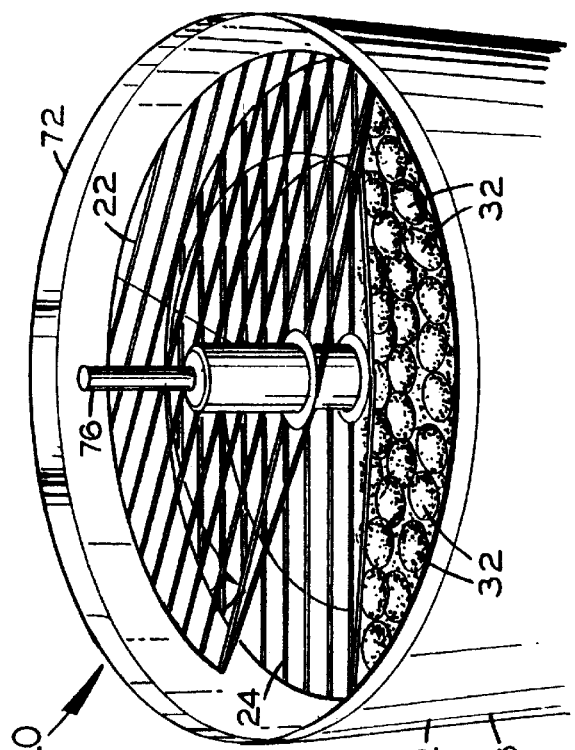
FIG. 5 is a top, perspective view of the grill apparatus of FIG. 3 with the lid removed, showing one food supporting grid section rotated most of the way underneath the other food supporting grid section, exposing charcoal briquettes.
Figure 16:
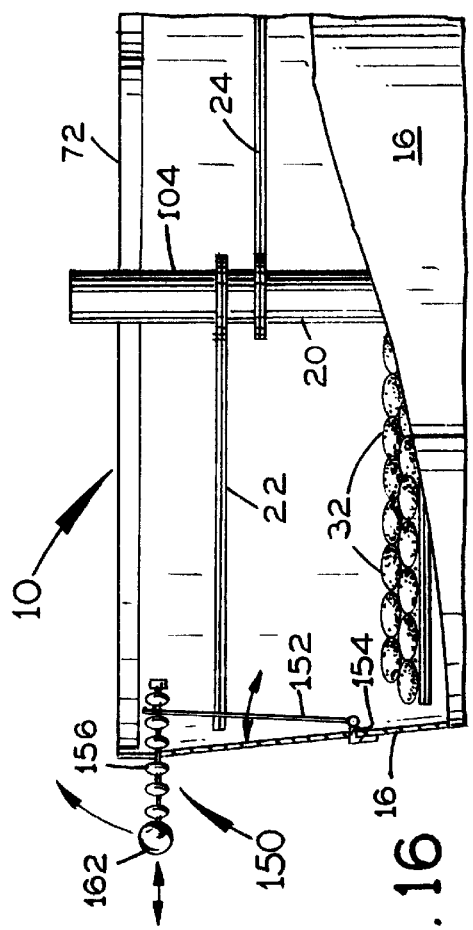
FIG. 16 is a cross-sectional side view of the apparatus housing, lid and food supporting grid, revealing the preferred grid rotation brake mechanism.
Figure 14:
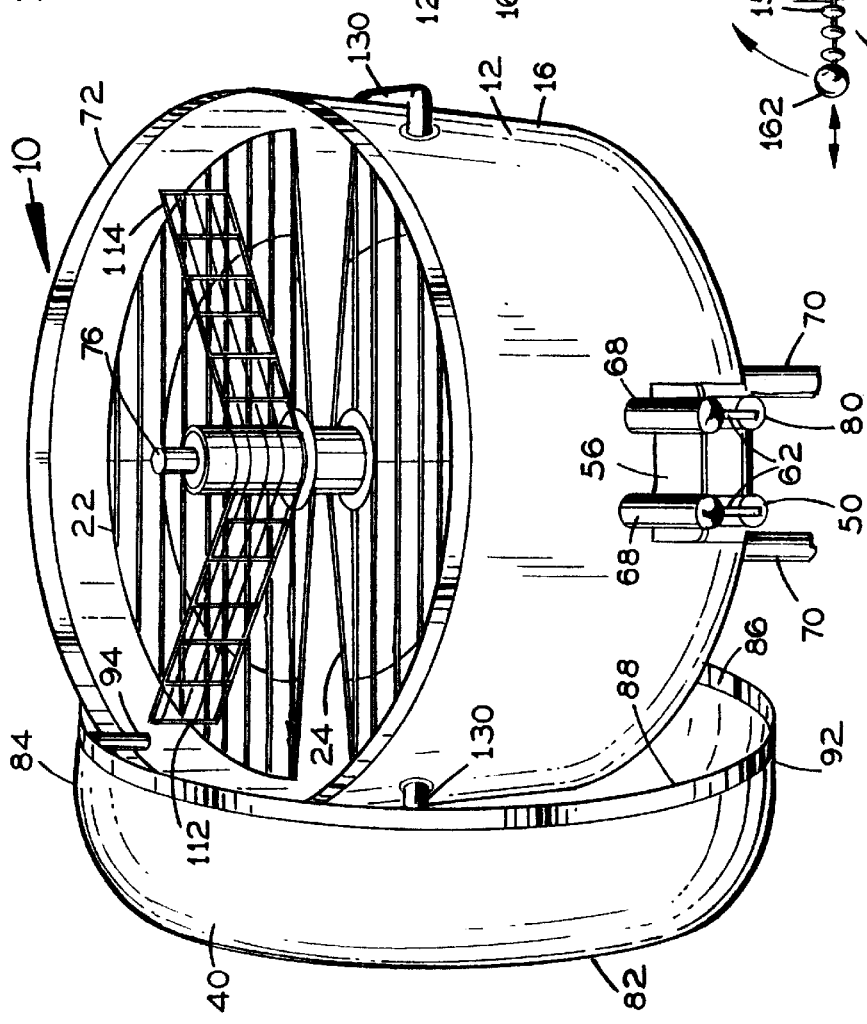
FIG. 14 is a perspective view of the apparatus showing the grid partitions and also showing the lid suspended from the housing rim by the optional hanging pin.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

Preferred Embodiments

Figure 6:
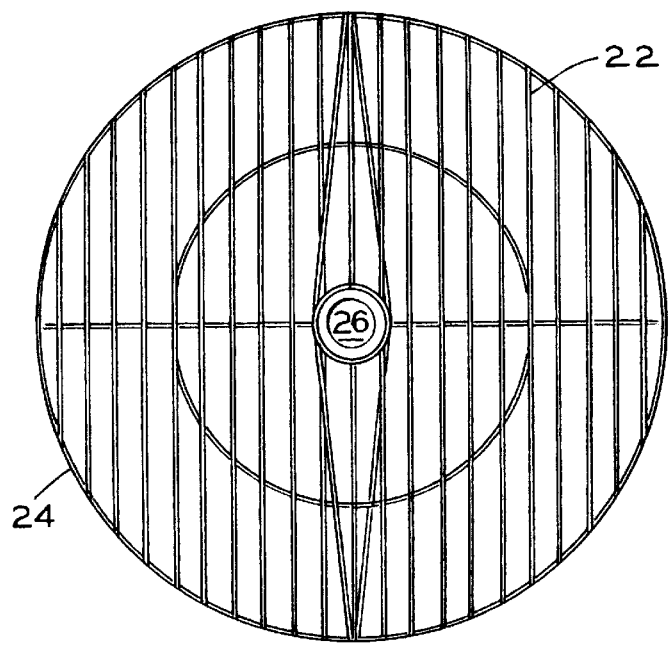
FIG. 6 is a top view of the two food supporting grid sections rotated relative to each other so that the lower grid section is entirely removed from under the upper grid section.
Figure 7:
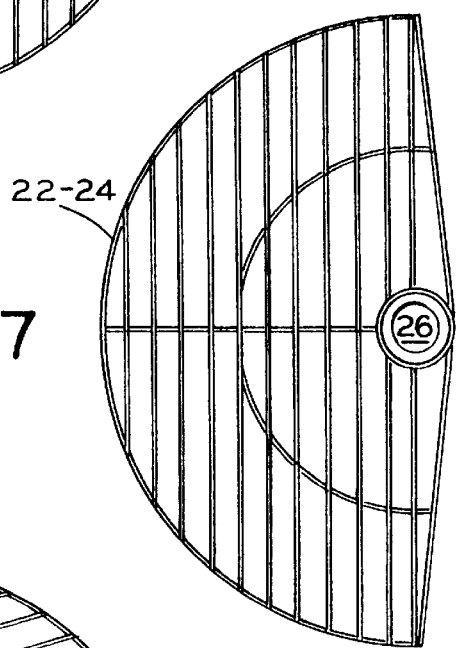
FIG. 7 is a view as in FIG. 6, with the food supporting grid sections rotated relative to each other so that the lower grid section is entirely underneath the upper grid section.
Figure 8:
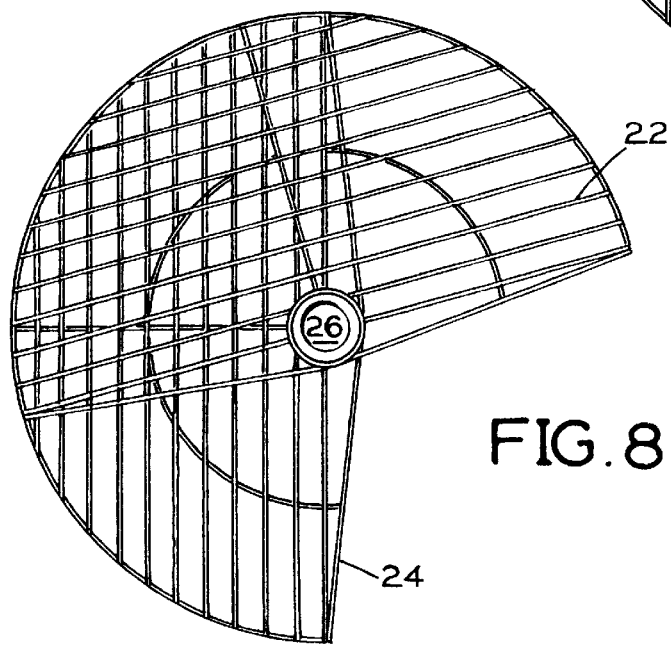
FIG. 8 is a view as in FIG. 7 with the food supporting grid sections rotated relative to each other so that the lower grid section is only partially removed from under the upper grid section.
Figure 9:
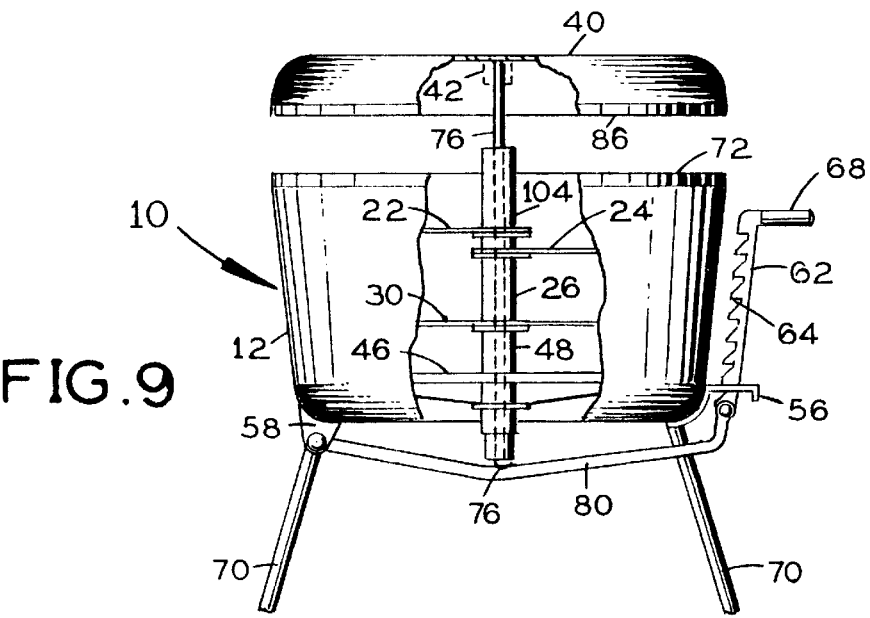
FIG. 9 is a cross-sectional side view of the apparatus housing and lid, with the lid in the fully elevated position, with the latching portion of the elevation mechanism omitted.
Figure 10:
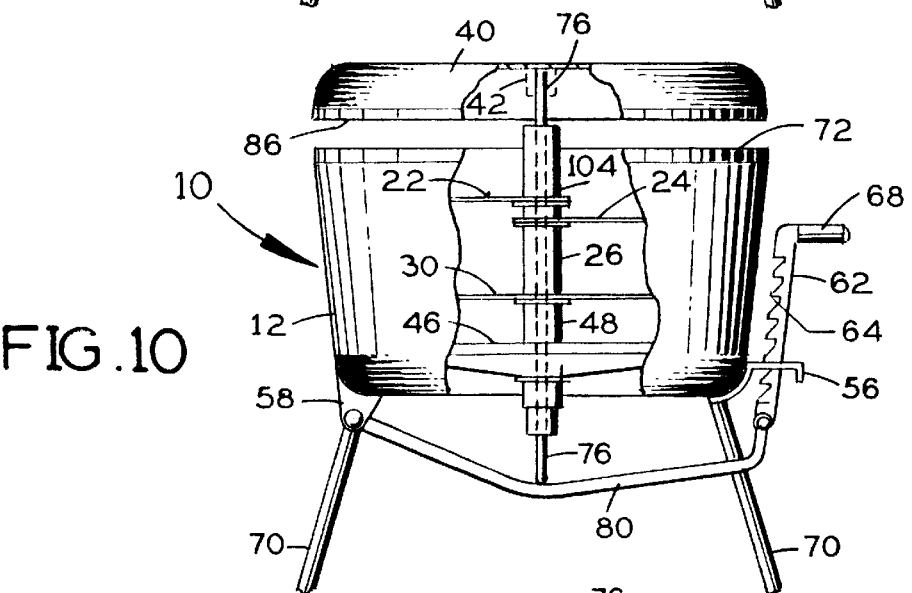
FIG. 10 is a side view of the apparatus housing and lid as in FIG. 9, with the lid in a partly elevated position.
Figure 11:
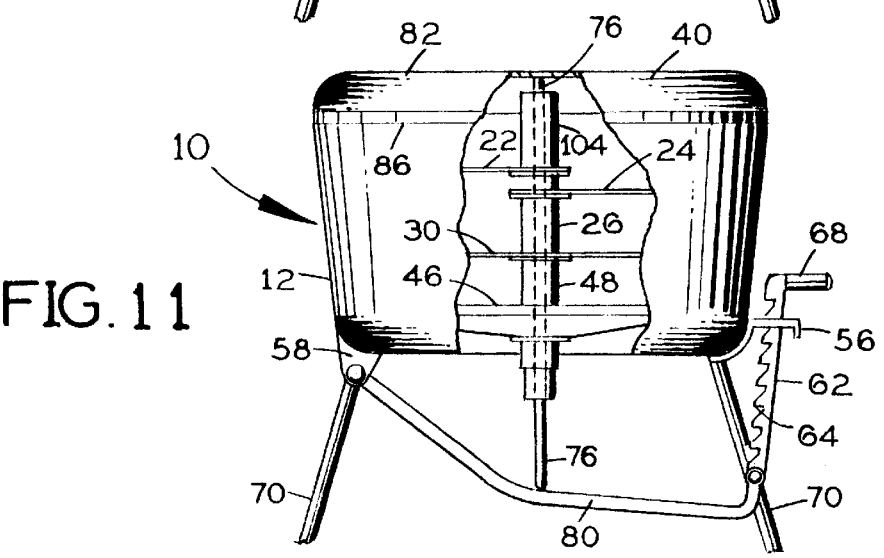
FIG. 11 is a side view of the apparatus housing and lid as in FIG. 9, with the lid in the closed position.
Figure 13:
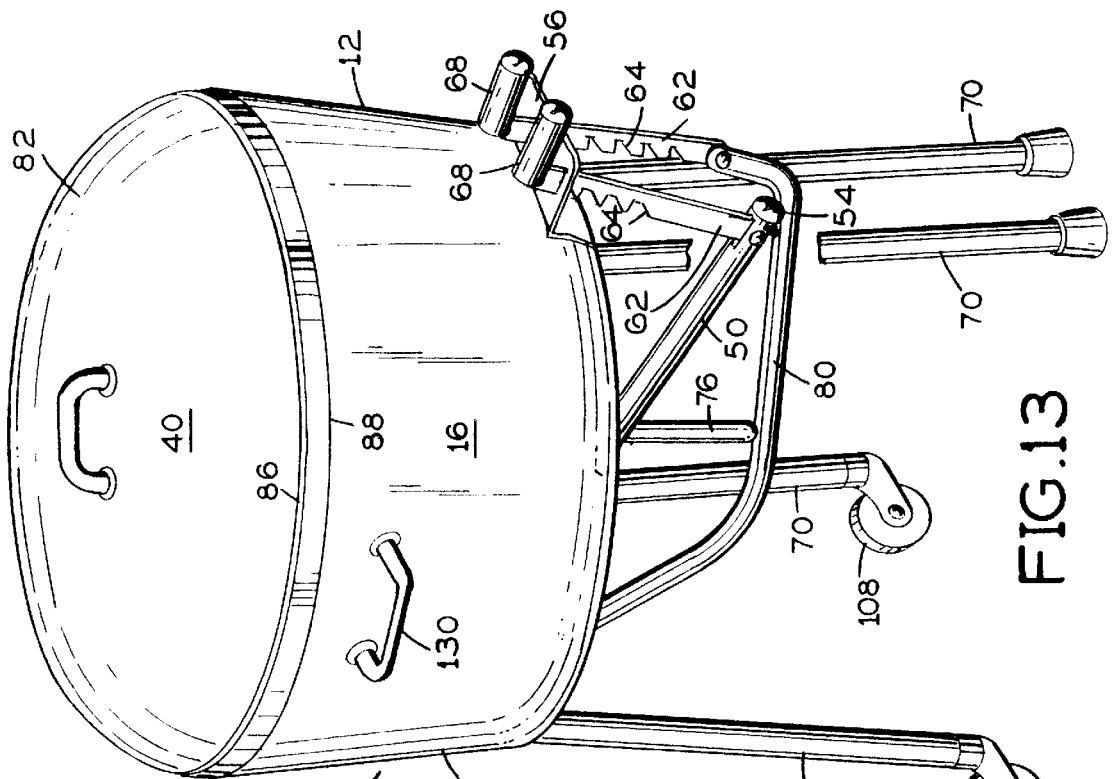
FIG. 13 is a view as in FIG. 12 with the lid shown in the closed position.
Figure 12:
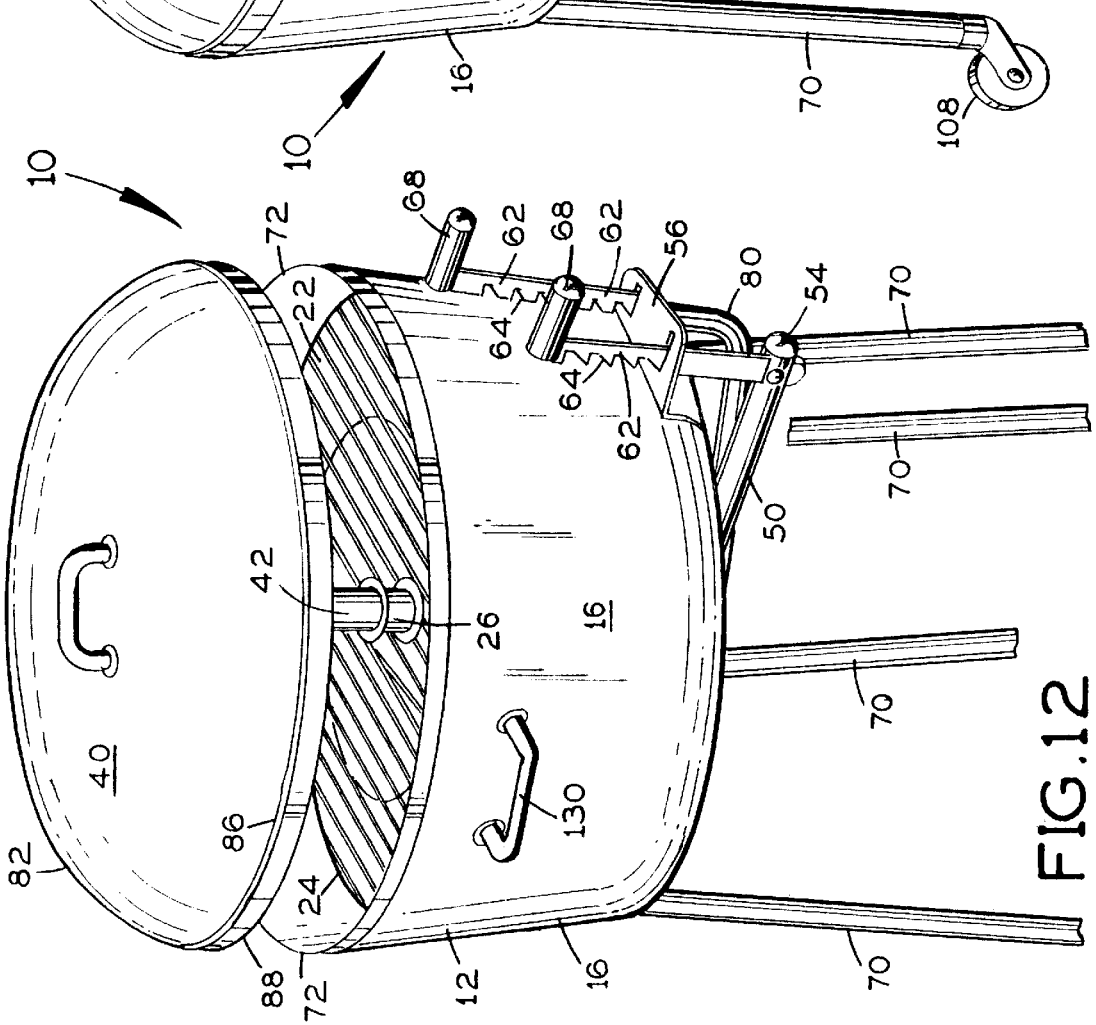
FIG. 12 is a perspective side view of the apparatus with the lid elevated from the housing, and showing the latching portion of the elevation mechanism.

Referring to FIGS. 1–16, a barbecue grill apparatus 10 is disclosed. Apparatus 10 includes a housing 12 having a housing bottom wall 14 and a housing side wall 16 and containing upper and lower food supporting grid sections 22 and 24, respectively, rotatably mounted one above the other on an upright central grill support member 26, and a fuel supporting grid 30 encircling support member 26 below food supporting grid sections 22 and 24 and spaced above housing bottom wall 14. Lower grid section 24 is rotatable underneath upper grid section 22 to provide the user with access to fuel supporting grid 30 for placement or retrieval of fuel items 32 or of a drip pan 34. See FIGS. 6–8. A single food grid 20 is alternatively provided.

Food items 18 may be placed between overlapping grid sections 22 and 24 to cook them from both top and bottom. Upper grid section 22 becomes hot through the radiation of heat from burning fuel items 32 and from heated housing 12, and conducts the heat over and into the food item 18 upper surfaces. The rotatability of grid sections 22 and 24 also permits indirect cooking by concentration of the fuel items 32 on just one region of fuel supporting grid 30 and by rotating the grid section 22 or 24 supporting the food items 18 to a position within housing 12 opposite the concentrated fuel items 32. A drip pan 34 can be placed under the grill section 22 or 24 supporting the food items 18.

Intermittent cooking can be achieved by periodically and repeatedly rotating grid sections 22 and 24 over and away from concentrated fuel items 32. Furthermore the free-spinning grill sections 22 and 24 can virtually eliminate uneven cooking to safely reduce harmful toxins released with overcooked meat and can control flare-ups during cooking, and finally can increase fuel efficiency.

The preferred fuel items 32, which include charcoal briquettes and wood pieces, are consumed by flames during cooking and leave spent fuel ashes 36 which fall through fuel supporting grid 30 to rest on housing bottom wall 14, or preferably in an ash retaining tray 46. See FIGS. 1–4 and 15. Ash retaining tray 46 is preferably an annular trough having an upright central hub tube 48 with a radially extending annular lip 38. Fuel supporting grid 30 preferably rests on annular lip 38. Furthermore, the user grips lip 38 to lift ash retaining tray 46 out of housing 12 and empty ashes 36.

Other heat sources such as electric resistance elements or gas jets are alternatively contemplated. The food supporting grid sections 22 and 24 and fuel supporting grid 30 thus define within housing 12 a food retaining level A, a fuel retaining level B and an ash retaining level C. Grid sections 22 and 24 and grid 30 are all removable from housing 12 for apparatus 10 cleaning and storage.

A preferred feature of the invention is a mechanism for raising and lowering lid 40 and food grid 20 or grid sections 22 and 24 and releasably latching these elements at a discrete elevation relative to housing side wall 16. A housing lid 40 having an internal central tubular fitting 42 is mounted onto and over a tubular grill support member 26 which is slidably fitted through a central port 44 in housing bottom wall 14. See FIGS. 1, 2, 4, 12 and 9–13. A first elevation arm 50 is pivotally connected between bottom wall flanges 58 with a pin through an arm first end 52 to housing bottom wall 14 at a point beneath housing side wall 16 and extends diametrically across and underneath housing bottom wall 14. First elevation arm 50 is pivotally connected to grill support member 26 with a pin 44a and extends beyond housing side wall 16, terminating in an arm second end 54. A latching plate 62 having a toothed edge 64 is pivotally connected to arm second end 54 and extends upwardly and adjacent to a locking rod 66 mounted in a rod frame 66 extending laterally from housing side wall 16. Latching plate 62 is pivoted so that locking rod 66 fits between any selected pair of teeth on latching plate toothed edge 64, thereby releasibly locking support member 26 and lid 40 at a given, selected elevation relative to housing side wall 16. A latching plate handle grip 68 is preferably provided at the upper end of latching plate 62 for the user to grip when pivoting plate 62. The rod frame 66 also includes an apparatus pull handle 56.

A pin 140 fits radially into a port in the upper end of first lower grid section mounting tube 102, described below, and rests in a notch 142 in lid tubular fitting 42. See FIG. 1. The interlocking of pin 140 and notch 142 permits the user to rotate the food supporting grid sections 22 and 24 by rotating housing lid 40.

As a result of this construction, lid 40 and food grid 20 are elevatable to selected levels relative to housing side wall 16 to provide varying degrees of lateral venting during cooking. See FIGS. 9–13. Housing lid 40 is also lowerable to a closing position in which lid 40 makes sufficient sealing contact with housing side wall 16 to obstruct the flow of oxygen into housing 12 and thereby to extinguish the fuel fire. This closing function is not only a convenience but also an important safety feature because it eliminates any possibility of sparks falling out of the housing and starting a dangerous and destructive fire. The closed lid 40 additionally protects apparatus 10 from the intrusion of rain water and leaves.

A second elevation arm 80 is optionally provided for lifting lid 40 only. This feature permits altering the flow of air into housing 12 without altering the proximity of the food items 18 to the fuel items 32. Second elevation arm 80 is pivotally pinned between flanges 58 at an arm first end 74 and extends diametrically across and underneath housing bottom wall 14. See FIG. 3. Second elevation arm 80 is pivotally connected to a lid lifting shaft 76 slidably retained within tubular support member 26 with a pin. Elevation arm 80 extends beyond housing side wall 16, and terminates in an arm second end 78. A latching plate (not shown) having a toothed edge (not shown) is pivotally connected to arm second end 78 and extends upwardly and adjacent to locking rod 66. Latching plate 90 is pivoted so that locking rod 66 fits between any selected pair of teeth on latching plate toothed edge 96, thereby releasibly locking lifting shaft 76 and lid 40 at a given, selected elevation relative to housing side wall 16. A latching plate handle grip (not shown) is preferably provided at the upper end of latching plate 90 for the user to grip when pivoting plate 90.

Housing bottom wall 14 is preferably concave and circular, and is mounted on three housing elevation legs 70. One leg 70 is preferably a pair of tubes extending generally below rod frame 66. See FIGS. 12 and 13. Two spaced apart legs 70 are provided on the opposing side of housing 12 and include caster wheels 108 at their lower ends. This arrangement permits the user to grip handle 56 and tilt housing 12 up on wheels 108, and to then roll apparatus 10 on wheels 108 to a desired location. Housing lid 40 preferably has an inverted dish shape, including a lid upper wall 82 integral with a lid side wall 84. Housing side wall 16 preferably terminates in an outwardly directed housing rim 72, and lid 40 includes an outwardly directed lid lip 86. See FIGS. 9–11. As a result, a broad and effective seal between housing 12 and lid 40 is attained between housing rim 72 and lid lip 86, and heat-laden air is better contained within housing 12 for improved efficiency. Alternatively, lid side wall 84 includes a downwardly directed lid lip 86, defined by an inward jog 92 and terminating in a lid rim 88. See FIG. 14. Lid lip 86 fits snugly inside housing side wall 16 and the jog 92 abuts the top of housing rim 72. Lid 40 is lifted entirely away from housing 12 for access during loading of fuel items 32 and placement of food items 18 to be cooked and for subsequent apparatus 10 cleaning. A hanger pin 94 is preferably provided in lid lip 86, extending radially inward, for abutting housing rim 72 and side wall 16 to suspend lid 40 from housing 12 while apparatus 10 is in use. See FIG. 14. The small mass of hanger pin 94 relative to lid 40 minimizes conducted heat transfer into lid 40 from the heated housing 12.

Food supporting grid sections 22 and 24 are preferably two semicircular half-disk grates. They can rotate to positions in which lower grid section 24 is directly and fully beneath upper grid section 22, in which lower grid section 24 is fully out from under upper grid section 22, and in an infinite variety of positions therebetween. See FIGS. 1, 3 and 6–8. This construction provides a variable-size cooking grid surface adaptable for the specific amount of food items 18 to be cooked, and also permits cooking of food items 18 between overlapping grid sections 22 and 24 as noted earlier. It is preferred that the lower grid section 24 includes a rigidly attached, perpendicular, upright first mounting tube 102 which is rotatable around grill support member 26 and has a top wall which rests on support member 26. Stop member 106 is removable to permit sliding of fuel supporting grid 30 upward and off support member 26. Upper grid section 22 includes a rigidly attached, perpendicular, upright second mounting tube 104 which is sized in interior diameter to fit rotatably around first mounting tube 102 and which rests on lower grid 24.

Fuel supporting grid 30 optionally includes first and second grid partitions 112 and 114, respectively, extending radially from grill support member 26 and which are rigidly attached to first and second partition mounting tubes 122 and 124, respectively, rotatably fitted over support member 26. First mounting tube 122 extends from the base of first grid partition 112 upwardly to half of the partition 112 height, and rests on fuel supporting grid 30. Second partition mounting tube 124 extends from the top of second grid partition 114 half way down its height and rests on first partition mounting tube 122. First and second grid partitions 112 and 114 pivot around grill mounting support member 26 to define a fuel retaining region of infinitely variable size and location. See FIG. 14. If a less than a full load of food items 18 is being cooked, the food items 18 are optionally grouped together at a selected area of food supporting grid sections 22 and 24, and fuel items 32 are grouped on fuel supporting grid 30 directly below the food items 18 and retained at this location between first and second grid partitions 112 and 114. Thus the amount and placement of fuel items 32 can be made to correspond to the sized, quantity and location of food items 18 being cooked at the moment, for improved fuel efficiency and economy.

The housing 12 and lid 40 are both preferably stamped out of sheet steel. Grill support member 26 is preferably a steel tubular member centered and vertical within housing 12.

An optional feature is a grid rotation brake mechanism 150. See FIG. 16. Brake mechanism 150 includes a brake arm 152 pivotally secured at its lower end to a pivot mount 154 anchored to housing side wall 16. Brake arm 152 has an adjustable notch link 156 extending through a port in housing side wall 16 with a handle ball 162 on the link 156 outer end. As a result, brake arm 152 is pivotable into contact with an outer edge of a grid section 22 or 24 to lock grid section 22 or 24 against rotation within housing 12. The grid section 22 and 24 outer edges are preferably provided with brake arm engaging teeth (not shown) for secure engagement with brake arm 152. One or both of grid sections 22 and 24 may be engaged by brake arm 152 at one time. When rotation of grid sections 22 and 24 is desired, notch link 156 is pulled out of contact with the side wall 16 port to free its notches, and brake arm 152 is pivoted toward side wall 16 and thus out of contact with the grid section 22 or 24 outer edge.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A barbecue grill apparatus for cooking food items, comprising:

a housing having a housing bottom wall and a housing side wall, a fuel retaining surface within said housing;

an upright grill support member extending centrally within said housing, and at least two food supporting grid sections mounted within said housing above said fuel retaining surface and one above the other on said upright grill support member and each extending radially outward from said upright grill support member toward said housing side wall over a radial section of said fuel retaining surface and defining a vertical section opening over a radial section of said fuel retaining surface, at least one said food supporting grid section being rotatably mounted on said upright grill support member to rotate relative to the other said food supporting grid section, such that one said grid section is rotatable to a position underneath another of said food supporting grid sections such that said section openings at least partially align, thereby creating a vertical fuel access opening between said grid sections for user access to said fuel retaining surface, additionally comprising lid and grid section elevation means, comprising:

a grill support member passing port in said housing bottom wall, said grill support member slidably fitted within said grill support member passing port, food supporting grid section engagement means on said grill support member, elevation means for raising and lowering said grill support member within said housing to any one of a plurality of discrete grill support member elevational positions and for releasibly retaining said grill support member at a given said elevational position, and a housing lid including means for mounting said housing lid onto said grill support member, such that said housing lid is elevated and lowered together with said grill support member and said food supporting grid sections.

2. An apparatus according to claim 1, wherein said fuel retaining surface comprises a fuel supporting grid mounted to said grill support member below said at least two food supporting grid sections and spaced above said housing bottom wall.

3. An apparatus according to claim 2, additionally comprising first and second grid partitions extending radially outward from said grill support member immediately above said fuel supporting grid and being mounted rotatably on said grill support member, such that said first and second grid partitions pivot around said grill support member to define a fuel retaining region on said fuel supporting grid of infinitely variable size and location.

4. An apparatus according to claim 3, wherein said first partition is fixedly attached to a first mounting tube and said second partition is fixedly attached to a second mounting tube, said first and second mounting tubes being rotatably fitted over said grill support member, said first mounting tube extending from a lower end of said first grid partition upwardly and resting against said fuel supporting grid, and said second mounting tube extending from an upper end of said second grid partition downwardly and resting on said first mounting tube.

5. An apparatus according to claim 1, wherein said means for mounting said housing lid, mounts said housing lid removably and comprises an upright tubular fitting secured to the interior of said housing lid, said upright tubular fitting being sized in diameter relative to said grill support member to fit over and onto said grill support member.

6. An apparatus according to claim 5, wherein said elevation means comprises:

an elevation arm having an arm first end and an arm second end and being pivotally connected to said housing at a first point spaced radially outward from said grill support member passing port, said elevation arm extending across and underneath said housing bottom wall and being pivotally connected at a second point to said grill support member between said elevation arm first and second ends, said second point being spaced apart from said first point, said elevation arm extending to and being pivotally connected at a third point to a latching plate having a toothed edge, said third point being spaced apart from said first point, a locking member mounted to said housing, such that said latching plate is pivotable to fit said locking member engagingly between any selected pair of teeth on said locking member toothed edge, thereby releasibly locking said grill support member and thus said lid and food supporting grid sections at a given, selected elevation relative to said housing and such that said food supporting grid sections are lowerable to a lid closing position in which said lid makes sufficient sealing contact with said housing side wall to obstruct the circulation of air into said housing and thereby extinguish a fuel fire.

7. An apparatus according to claim 5, wherein said lid upright tubular fitting comprises a pin receiving notch, and wherein at least one said food supporting grid sections comprises a grid frame and an upright grid mounting tube fixedly attached to said grid frame and fitted rotatably around said grill support member, said grid mounting tube comprising a radial port; additionally comprising:

a lid rotational locking pin passing into said radial port in said grid mounting tube and fitting laterally into said pin receiving notch in said lid upright tubular fitting for constraining said lid to rotate substantially in unison with said at least one grid section on said grill support member.

8. An apparatus according to claim 1, wherein said housing side wall terminates in an upwardly directed housing rim, and wherein said lid includes a lid upper wall integral with a lid side wall, said lid side wall terminating in a downwardly directed lid lip.

9. An apparatus according to claim 8, additionally comprising a hanging pin secured to and extending within said lid at a point along said lid lip for abutting said housing rim to removably suspend said lid beside said housing and from said housing rim, during loading and removal of fuel and food items and during apparatus cleaning.

10. An apparatus according to claim 1, wherein said food supporting grid sections are two semicircular half-disk upper and lower grid sections, said upper and lower grid sections being rotatable relative to each other to any one of the positions of: said lower grid section being directly and fully beneath said upper grid section; said lower grid section being fully removed from under said upper grid section to form a composite full circular grid, and said lower grid section being only partially beneath said upper grid section.

11. An apparatus according to claim 10, additionally comprising a support member stop; wherein said lower grid section comprises a lower grid frame and an upright first mounting tube having a top wall and being fixedly attached to said lower grid frame and fitted rotatably around said grill support member, said upright first mounting tube abutting and resting on said support member stop;

and wherein said upper grid section comprises an upper grid frame and an upright second mounting tube fixedly attached to said upper grid frame, said second mounting tube being sized in interior diameter to fit rotatably around said first mounting tube, such that said upper grid section rests on said lower grid section.

12. An apparatus according to claim 1, additionally comprising an annular ash retaining tray sized to fit around and over said grill support member and into said housing beneath said fuel retaining surface.

13. An apparatus according to claim 12, wherein said ash retaining tray comprises an ash retaining tray hub tube extending upwardly from the center of said ash retaining tray.

14. An apparatus according to claim 13, wherein said ash retaining tray hub tube comprises a radially extending hub tube lip abutting and supporting said fuel retaining grid and for gripping by a user to lift said ash retaining tray.

15. A barbecue grill apparatus for cooking food items, comprising:

a housing having a housing bottom wall and a housing side wall, an upright grill support member extending within said housing, at least one food supporting grid section mounted on said grill support member, and grid section rotation brake means for releasibly securing said food supporting grid section against rotation relative to said housing side wall.

16. A barbecue grill apparatus for cooking food items, comprising:

a grill housing having a housing bottom wall and a housing side wall, an upright tubular grill support member secured within said grill housing, and a food supporting grid sections rotatably mounted on said grill support member, a grill support member passing port in said housing bottom wall, said grill support member slidably fitted within said grill support member passing port, food supporting grid section engagement means on said grill support member, first elevation means for raising and lowering said grill support member within said housing to any one of a plurality of discrete grill support member elevational positions and for releasibly retaining said grill support member at a given said elevational position, and a housing lid including means for mounting said housing lid onto said grill support member, such that said housing lid is elevated and lowered together with said grill support member and said food supporting grid sections.

17. An apparatus according to claim 16, additionally comprising:

a lid lifting shaft slidably retained within said tubular grill support member, and second elevation means for raising and lowering said lid lifting shaft within said housing to any one of a plurality of discrete support member elevational positions and for releasibly retaining said lid lifting shaft and lid at a given said elevational position, and means for mounting said housing lid onto said lid lifting shaft, such that said housing lid is elevated and lowered together with said lid lifting shaft and said food supporting grid.

18. An apparatus according to claim 17, wherein said second elevation means comprises:

a second elevation arm having an arm first end and an arm second end and being pivotally connected to said housing at a first point spaced radially outward from said grill support member passing port, said elevation arm extending across and underneath said housing bottom wall and being pivotally connected at a second point to said lid lifting shaft between said second elevation arm first and second ends, said second point being spaced apart from said first point, said elevation arm extending to and being pivotally connected at a third point to a second latching plate having a toothed edge, said third point being spaced apart from said first point, and said locking member mounted to said housing, such that said second latching plate is pivotable to fit said locking member engagingly between any selected pair of teeth on said locking member toothed edge, thereby releasibly locking said lid lifting shaft and thus said lid at a given, selected elevation relative to said housing and such that said lid is lowerable to a closing position in which said lid makes sufficient sealing contact with said housing side wall to obstruct the circulation of air into said housing and thereby extinguish a fuel fire.

19. An apparatus according to claim 16, wherein said first elevation means comprises:

a first elevation arm having an arm first end and an arm second end and being pivotally connected to said housing at a first point spaced radially outward from said grill support member passing port, said elevation arm extending across and underneath said housing bottom wall and being pivotally connected at a second point to said grill support member between said elevation arm first and second ends, said second point being spaced apart from said first point, said elevation arm extending to and being pivotally connected at a third point to a first latching plate having a toothed edge, said third point being spaced apart from said first point, and a locking member mounted to said housing, such that said first latching plate is pivotable to fit said locking member engagingly between any selected pair of teeth on said locking member toothed edge, thereby releasibly locking said grill support member and thus said lid and food supporting grid sections at a given, selected elevation relative to said housing and such that said food supporting grid sections are lowerable to a lid closing position in which said lid makes sufficient sealing contact with said housing side wall to obstruct the circulation of air into said housing and thereby extinguish a fuel fire.

20. A barbecue grill apparatus for cooking food items, comprising:

a housing having a housing bottom wall and a housing side wall, an upright grill support member extending centrally within said housing, and at least two food supporting grid sections mounted one above the other on said grill support member, at least one said food supporting grid section being mounted rotatably relative to the other said food supporting grid section, such that one said grid section is rotatable to a position underneath another of said food supporting grid sections, and lid and grid section elevation means, a grill support member passing port in said housing bottom wall, said grill support member slidably fitted within said grill support member passing port, food supporting grid section engagement means on said grill support member, elevation means for raising and lowering said grill support member within said housing to any one of a plurality of discrete grill support member elevational positions and for releasibly retaining said grill support member at a given said elevational position, and a housing lid including means for mounting said housing lid onto said grill support member, such that said housing lid is elevated and lowered together with said grill support member and said food supporting grid sections, wherein said housing side wall terminates in an upwardly directed housing rim, and wherein said lid includes a lid upper wall integral with a lid side wall, said lid side wall including a downwardly directed lid lip.

21. A barbecue grill apparatus for cooking food items, comprising:

a housing having a housing bottom wall and a housing side wall, an upright grill support member extending centrally within said housing, and at least two food supporting grid sections mounted one above the other on said grill support member, a first said food supporting grid section being mounted rotatably relative to the other said food supporting grid section, such that said first food supporting grid section is rotatable to a position underneath said second food supporting grid section, and lid and grid section elevation means, a grill support member passing port in said housing bottom wall, said grill support member slidably fitted within said grill support member passing port, food supporting grid section engagement means on said grill support member, elevation means for raising and lowering said grill support member within said housing to any one of a plurality of discrete grill support member elevational positions and for releasibly retaining said grill support member at a given said elevational position, and a housing lid including means for mounting said housing lid onto said grill support member, such that said housing lid is elevated and lowered together with said grill support member and said food supporting grid sections, wherein said means for mounting said housing lid mounts said housing lid removably and comprises an upright tubular fitting secured to the interior of said housing lid, said upright tubular fitting being sized in diameter relative to said grill support member to fit over and onto said grill support member, wherein said lid upright tubular fitting comprises a pin receiving notch, and wherein said grid section comprises a grid frame and an upright grid mounting tube fixedly attached to said grid frame and fitted rotatably around said grill support member, said grid mounting tube comprising a radial port, a lid rotational locking pin passing into said radial port in said grid mounting tube and fitting laterally into said pin receiving notch in said lid upright tubular fitting for constraining said lid to rotate substantially in unison with said grid section on said grill support member.

22. A barbecue grill apparatus for cooking food items, comprising:

a grill housing, an upright tubular grill support member secured within said grill housing, and a food supporting grid rotatably mounted on said grill support member, a grill support member passing port in said housing bottom wall, said grill support member slidably fitted within said grill support member passing port, food supporting grid engagement means on said grill support member, first elevation means for raising and lowering said grill support member within said housing to any one of a plurality of discrete grill support member elevational positions and for releasibly retaining said grill support member at a given said elevational position, and a housing lid including means for mounting said housing lid onto said grill support member, such that said housing lid is elevated and lowered together with said grill support member and said food supporting grid, a lid lifting shaft slidably retained within said tubular grill support member, second elevation means for raising and lowering said lid lifting shaft within said housing to any one of a plurality of discrete support member elevational positions and for releasibly retaining said lid lifting shaft and lid at a given said elevational position, and means for mounting said housing lid onto said lid lifting shaft, such that said housing lid is elevated and lowered together with said lid lifting shaft and said food supporting grid.

* * * * *